United States Patent
Okada et al.

(10) Patent No.: US 6,213,882 B1
(45) Date of Patent: Apr. 10, 2001

(54) POWER TRANSMISSION MECHANISM AND ITS ASSEMBLY METHOD

(75) Inventors: Masahiko Okada; Akifumi Uryu; Kazuya Kimura; Kenji Takenaka, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/362,826

(22) Filed: Jul. 28, 1999

(30) Foreign Application Priority Data

Jul. 30, 1998 (JP) .................................... 10-216014

(51) Int. Cl.[7] ...................................................... F16D 3/52
(52) U.S. Cl. ............................. 464/77; 464/30; 464/160; 192/55.1
(58) Field of Search ................................ 464/30, 77, 57, 464/160; 192/55.1, 56.1, 56.2

(56) References Cited

U.S. PATENT DOCUMENTS

| | | | | |
|---|---|---|---|---|
| 2,988,187 | * | 6/1961 | Doble ...................................... | 464/77 |
| 4,194,607 | * | 3/1980 | Yamaguchi ............................. | 192/35 |
| 4,243,128 | * | 1/1981 | Shirai ...................................... | 192/35 |
| 4,480,736 | * | 11/1984 | Loizeau .................................. | 464/57 |
| 4,718,526 | * | 1/1988 | Koitabashi ............................. | 464/89 |
| 5,542,884 | * | 8/1996 | Gotz ....................................... | 464/36 |
| 5,967,274 | * | 10/1999 | Leone et al. .......................... | 192/35 |

* cited by examiner

Primary Examiner—Anthony Knight
Assistant Examiner—Kenn Thompson
(74) Attorney, Agent, or Firm—Morgan & Finnegan, LLP

(57) ABSTRACT

A power transmission mechanism having a pulley rotor and a release plate. The pulley rotor is coaxial with the release plate, and power from the pulley rotor is transmitted to the release plate to rotate the pulley rotor and the release plate in the same direction. A spiral spring is located between the pulley rotor and the release plate. The spiral spring is releasably engaged with the pulley rotor. A transmission surface is provided on the pulley rotor to oppose and engage a free end of the spiral spring. The transmission surface transfers power from the pulley rotor to the release plate, and relative rotation between the pulley rotor and the release plate is permitted due to deformation of the spiral spring. A release projection causes the free end of the spiral spring to move and separate from the transmission surface in accordance with relative rotation between the pulley rotor and the release plate when the load applied to the release plate exceeds a predetermined value. Therefore, if the release plate applies an unusually strong load to the pulley rotor, it will be released from the pulley rotor.

21 Claims, 8 Drawing Sheets

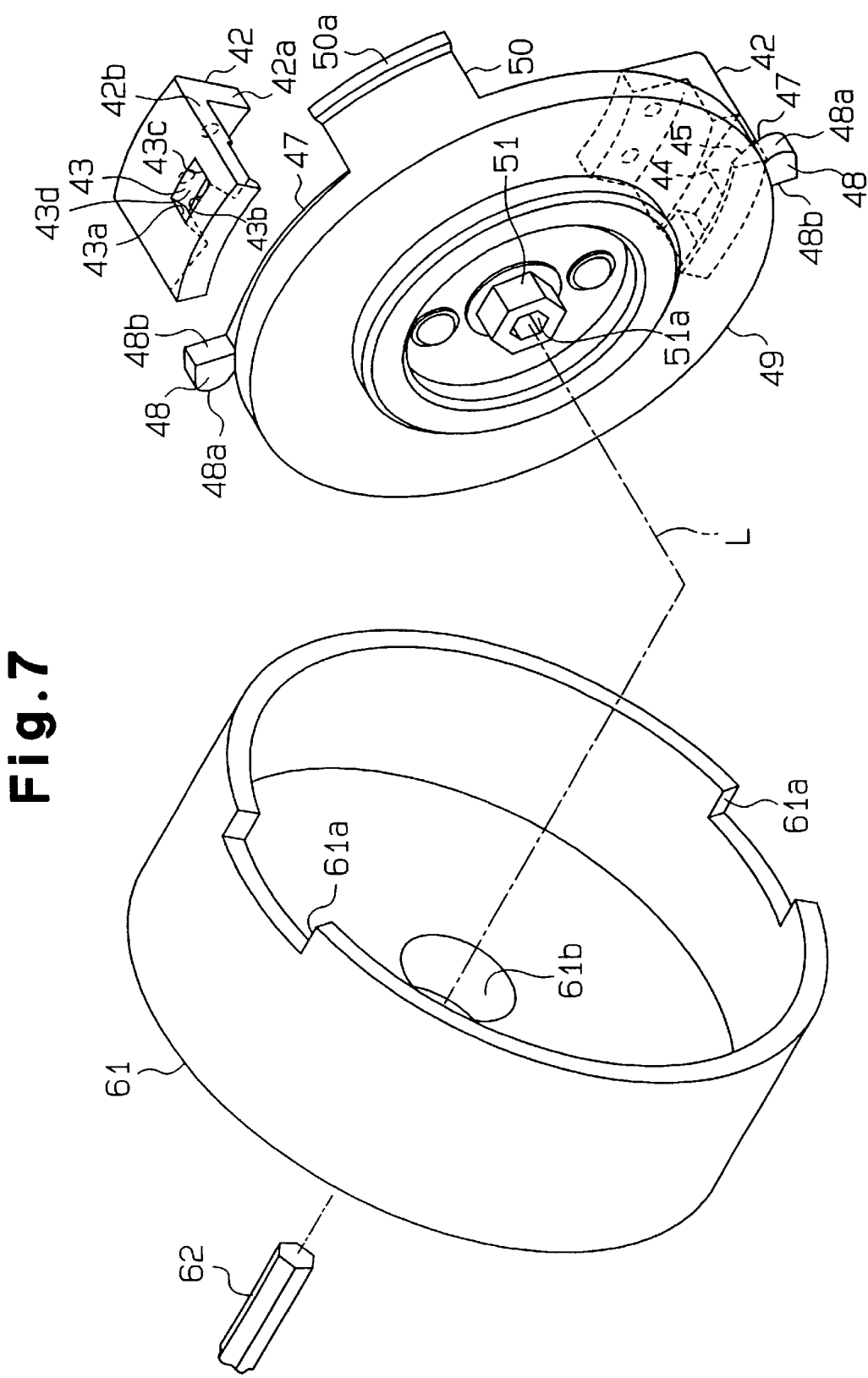

POWER TRANSMISSION MECHANISM AND ITS ASSEMBLY METHOD

BACKGROUND OF THE INVENTION

The present invention relates to a power transmission mechanism that connects a power source to a powered device. More specifically, the present invention pertains to a power transmission mechanism having a disconnection mechanism that cuts power transmission from a vehicle engine to a compressor when an excessive torque load is applied to the compressor of a vehicle air-conditioning system.

Generally, a power transmission mechanism of this kind includes a power transmitter. The power transmitter is located between a rotor located on the engine and a drive shaft of the compressor. When a torque load applied to the compressor exceeds a predetermined value, the power transmitter is deformed and disconnects the power transmission between the rotor and the drive shaft. As a result, excessive torque load does not affect the engine.

However, when the engine is operated at high or middle speed and is suddenly decelerated or stopped, a negative torque can be applied to the drive shaft. That is, when the reduction of rotation speed of the compressor drive shaft is slower than the reduction of engine speed, the compressor seems to be independently operating. This is due to the inertia of the compressor. In this state, the negative torque may disconnect the power transmission mechanism.

SUMMARY OF THE INVENTION

An objective of the present invention is to provide a power transmission mechanism that prevents unnecessary disconnection of power transmission when a negative torque load is applied to a powered device.

To achieve the above objective, the present invention provides a power transmission mechanism having a first rotor and a second rotor. The second rotor is coaxial with the first rotor, and power from the first rotor is transmitted to the second rotor to rotate the first and the second rotors in the same direction. The mechanism is structured as follows. A resilient power transmission member is located between the first and the second rotors. The power transmission member has a fixed end that is fixed to one of the first and the second rotors and a free end that is releasably engaged with the other of the first and the second rotors. A transmission surface is provided on the other of the first and the second rotors to oppose and engage the free end of the power transmission member. When the transmission surface engages the free end of the transmission member, the transmission surface transfers power from the first rotor to the second rotor, and relative rotation between the first and the second rotors is permitted due to deformation of the power transmission member in accordance with the load of the second rotor. The transmission of power is discontinued if the free end of the transmission member is separated from the transmission surface. A release member separates the free end of the power transmission member from the transmission surface in accordance with relative rotation between the first rotor and the second rotor when the load applied to the second rotor exceeds a predetermined value. An engaging surface on the other of the first and the second rotors is opposed to the transmission surface for engaging the free end of the power transmission member if the second rotor is driven faster than the first rotor by inertia when the first rotor is decelerated.

The present invention further provides a method for assembling a power transmission mechanism having a first rotor and a second rotor. The second rotor is coaxial with the first rotor, and power from the first rotor is transmitted to the second rotor to rotate the first and the second rotors in the same direction. The method includes the following steps. First, fixing a resilient power transmission member to the second rotor. The power transmission member has a fixed end and a free end. Then, forming a transmission surface and a limiting surface on the first rotor. Then, engaging the free end of the transmission member with the transmission surface and the limiting surface by deforming the power transmission member axially and radially.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 7 is an exploded perspective view illustrating a pulley assembly method;

DETAILED DESCRIPTION OF THE PREFERRED EMBODIMENTS

A power transmission mechanism of a variable displacement compressor (or other driven device) according to a first embodiment of the present invention will now be described.

Figure 1:
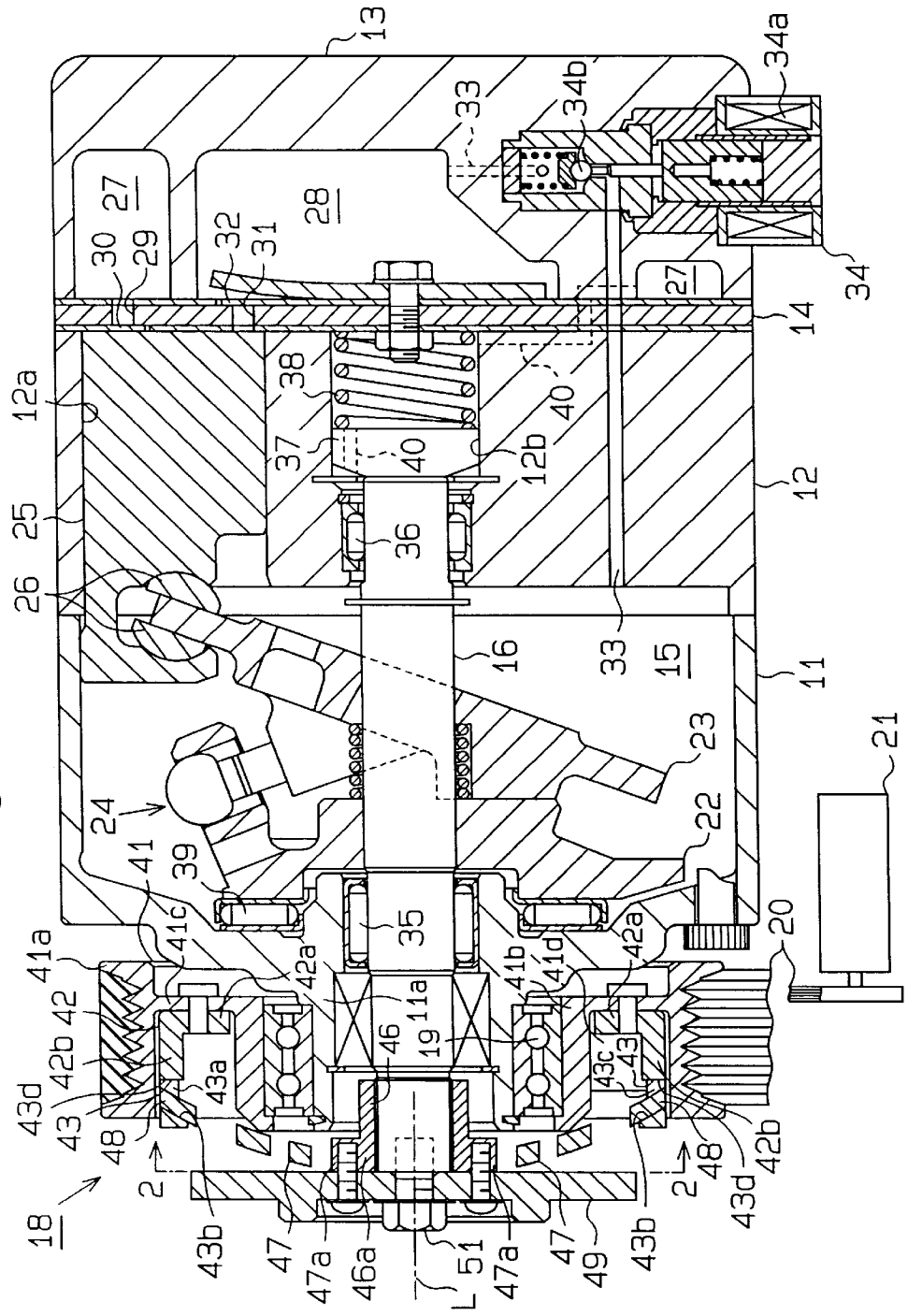
FIG. 1 is a longitudinal cross sectional view of a clutchless type variable displacement compressor.

As shown in FIG. 1, a front housing member 11 is joined to the front of a cylinder block 12. A rear housing member 13 is joined to the rear of the cylinder block 12 through a valve plate 14. A crank chamber 15 is defined by the front housing 11 and the cylinder block 12. A drive shaft 16 is rotatably supported in the front housing member 11 and the cylinder block 12 and passes through the crank chamber 15.

The front end of the drive shaft 16 is supported in the front housing member 11 through a front radial bearing 35. A central bore 12b is formed in the center of the cylinder block 12. The rear end of the drive shaft 16 is located in the central bore 12b and is supported by the inner surface of the central bore through a rear radial bearing 36. A thrust bearing 37 and a spring 38 are located in the central bore 12b between the rear end surface of the drive shaft 16 and the valve plate 14. The spring 38 urges the drive shaft 16 frontward. The thrust bearing 37 is located between the spring 38 and the drive shaft 16 and prevents transmission of rotation from the drive shaft 16 to the spring 38.

The front end of the drive shaft 16 passes through the front wall of the front housing member 11 and extends frontward. A boss 11a is integrally formed at front of the front housing member 11 and surrounds the front end of the drive shaft 16. A pulley mechanism 18 having a torque limit function is rotatably supported on the peripheral surface of the boss 11a by an angular bearing 19. The pulley mechanism 18 is joined to the drive shaft 16. The pulley mechanism 18 is directly connected to a vehicle engine (power source) through a belt 20 without a clutch mechanism such as an electromagnetic clutch. Accordingly, the engine 21 rotates the drive shaft 16 through the belt 20 and the pulley mechanism 18.

A rotor 22 is secured to the drive shaft 16 in the crank chamber 15. A swash plate 23 is supported on the drive shaft 16. A hinge mechanism 24 is located between the rotor 22 and the swash plate 23. The hinge mechanism 24 enables the swash plate 23 to incline relative to the drive shaft 16 and to rotate integrally with the drive shaft 16.

Cylinder bores 12a are formed to pass through the cylinder block 12. A single-headed piston 25 is accommodated in each cylinder bore 12a. Each piston 25 is coupled to the peripheral edge of the swash plate 23 through shoes 26. The rotation of the drive shaft 16 is converted into the reciprocation of each piston 25 through the swash plate 23 and the shoes 26.

A suction chamber 27 and a discharge chamber 28 are defined in the rear housing member 13. A suction port 30 and a discharge port 32 are formed in the valve plate 14. When the piston 25 moves from the top dead center position to the bottom dead center position, refrigerant gas in the suction chamber 27 is drawn into the cylinder bore 12a through the suction port 29 and a suction valve 30. Then, the refrigerant is compressed to a predetermined pressure in the cylinder bore 12a when the piston moves from the bottom dead center position to the top dead center position. Then, the refrigerant is discharged into a discharge chamber 28 through the discharge port 31 and a discharge valve 32.

A thrust bearing 39 is located between the rotor 22 and the inner wall of the front housing 11. The thrust bearing 39 receives a compression load applied to the rotor 22 through the piston 25 and the swash plate 23.

A pressurizing passage 33 connects the discharge chamber 28 to the crank chamber 15. A bleeding passage 40 connects the crank chamber 15 to the suction chamber 27. A displacement control valve 34 is located in the pressurizing passage 33. The control valve is an electromagnetic valve that operates a valve body 34b by exciting/de-exciting a solenoid 34a. The control valve 34 varies the opening size of the pressurizing passage 33, which adjusts the flow of the discharged refrigerant gas to the crank chamber 15. The flow rate of refrigerant gas to the crank chamber 15 through the pressurizing passage 33 and the flow rate of refrigerant gas to the suction chamber through the bleeding passage 40 determine the pressure in the crank chamber 15. Accordingly, the difference between the pressure in the crank chamber 15 and the pressure in the cylinder bore is varied, and this varies the inclination of the swash plate 23. As a result, the stroke of each piston 25 is varied and the compressor displacement is adjusted.

The pulley mechanism 18, which has a torque limit function, will now be described.

Figure 2:
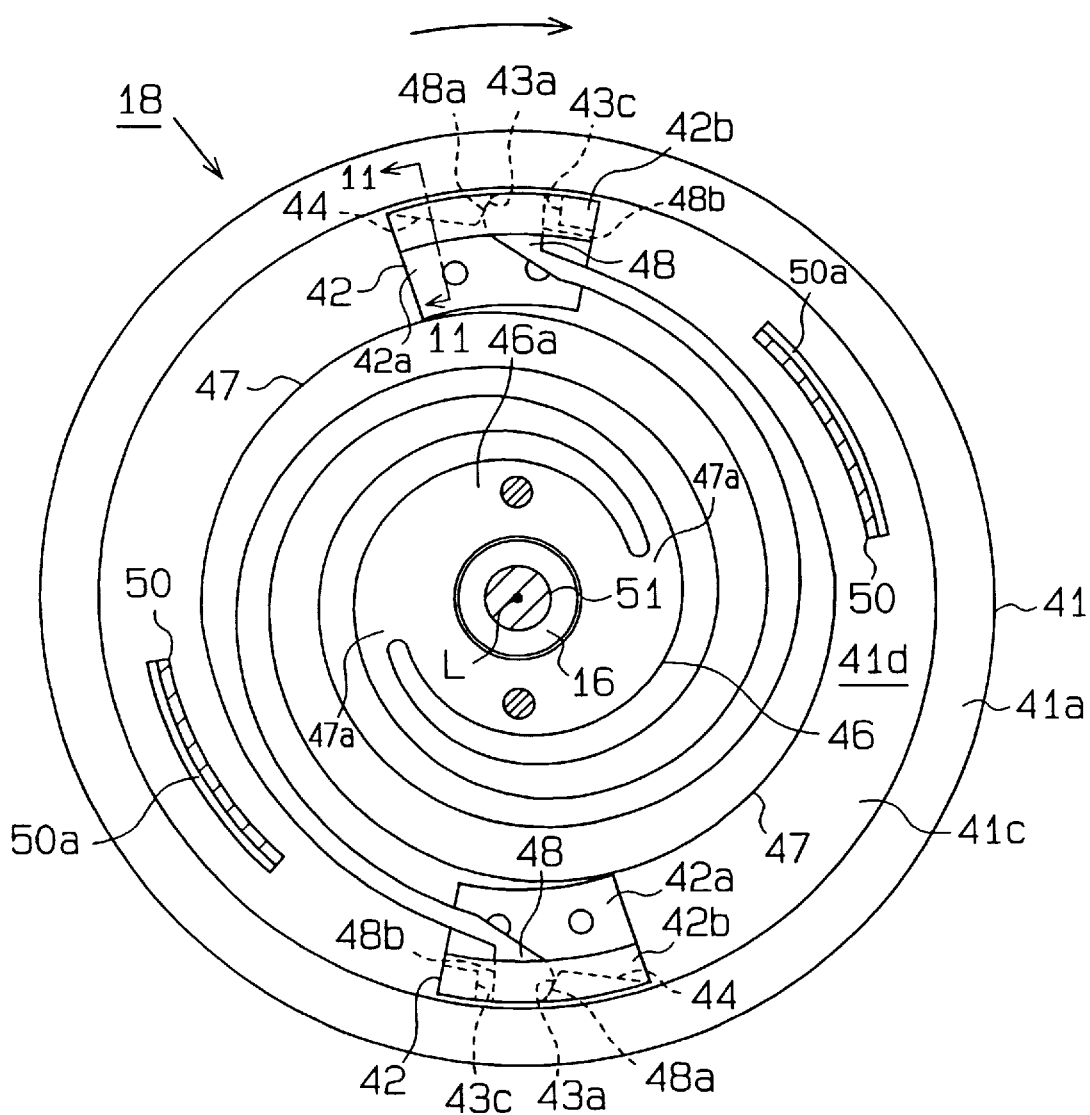
FIG. 2 is a cross sectional view of FIG. 1 taken on the line 2—2 of FIG. 1.

As shown in FIGS. 1 and 2, a first rotor, or a pulley rotor 41, includes a sheave 41a. The pulley rotor 41 also includes an inner cylinder 41b, which is concentric with the sheave 41a. A disc 41c connects the sheave 41a to the inner cylinder 41b.

The pulley rotor 41 is secured about the angular bearing 19 with the inner cylinder 41b. A belt 20, which extends from the engine 21, engages the sheave 41a. An annular inner space 41d of the pulley rotor 41 is defined by the sheave 41a, the inner cylinder 41b, and the disc 41c and is open towards the front.

A pair of couplers 42 are independent from the pulley rotor 41. Each coupler 42 includes a flange 42a and an outer wall 42b. The outer wall 42b is formed on the outer edge of the flange 42a. The cross sectional area of each coupler 42 is L-shaped as shown in FIG. 1. Each coupler 42 is accommodated in the inner space 41d of the pulley rotor 41, and the flange 42a of each coupler 42 is fixed to the front-end surface of the disc 41c. Accordingly, the outer wall 42b of each coupler 42 extends frontward from the edge of the flange 42a in the axial direction. The couplers 42 are arranged about the axis L and are spaced apart by 180 degrees.

Figure 3:
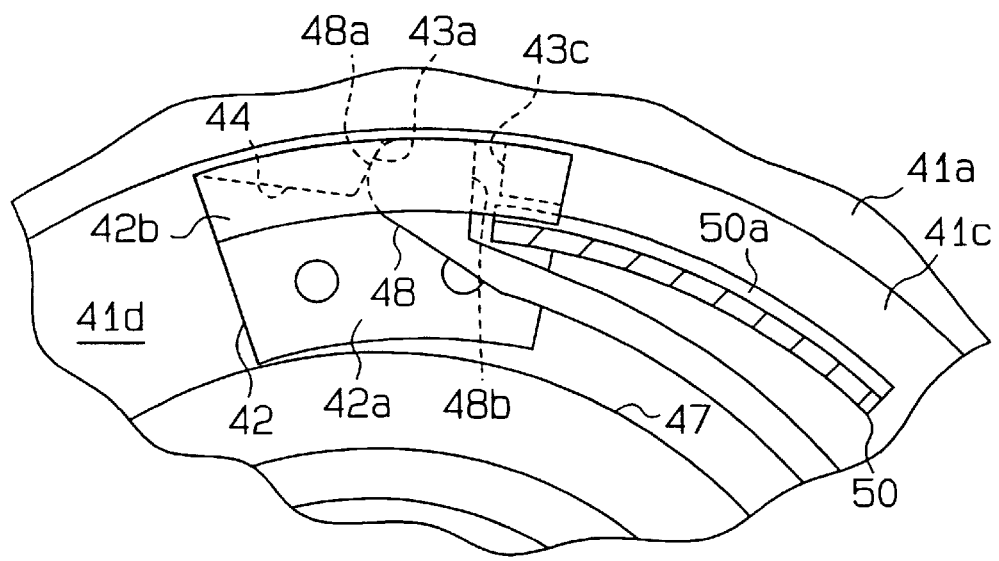
FIG. 3 is a partial enlarged cross sectional view for illustrating the disconnection of power transmission.

A coupling hole 43 is formed in the outer wall 42b of each coupler 42. Each coupling hole 43 has a rectangular cross-sectional shape and opens to the outer and inner surfaces of the outer wall 42b. The walls defining each coupling hole 43 include first and second surfaces 43a, 43c, which face one another as shown in FIG. 3, and third and fourth surfaces 43b, 43d, which face one another in the axial direction as shown in FIG. 1. The second surfaces 43c are sometimes referred to as engagement surfaces 43c.

Each first surface 43a is inclined as shown in FIG. 3. Therefore, the inner opening of each coupling hole 43 is larger than the outer opening. Each first surface 43a forms a power-transmitting surface. Each third surface 43b is inclined as shown in FIG. 1, which makes the inner openings of each coupling hole 43 larger than the outer openings. Each third surface 43b has a longer dimension, as measured on the cross sectional plane of FIG. 1, than the first and second surfaces 43a, 43c.

Figure 9:
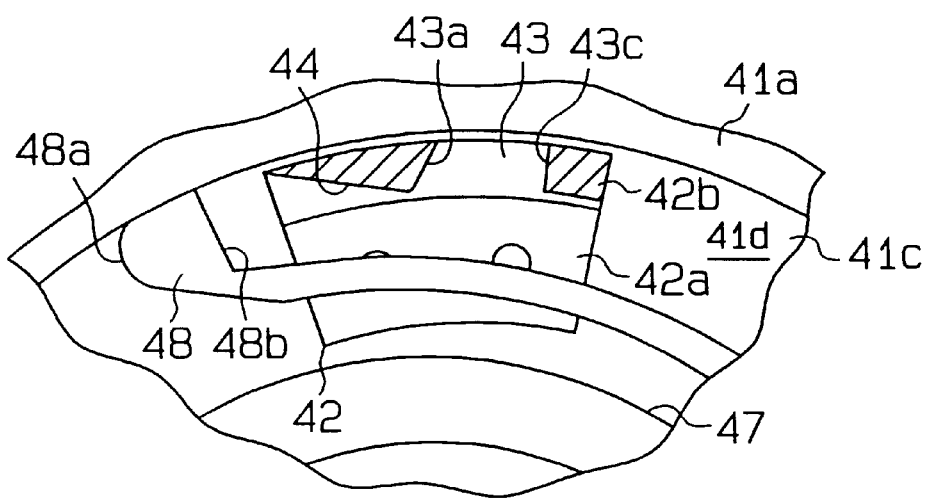
FIG. 9 is a partial cross sectional view illustrating the state of FIG. 8.
Figure 10:
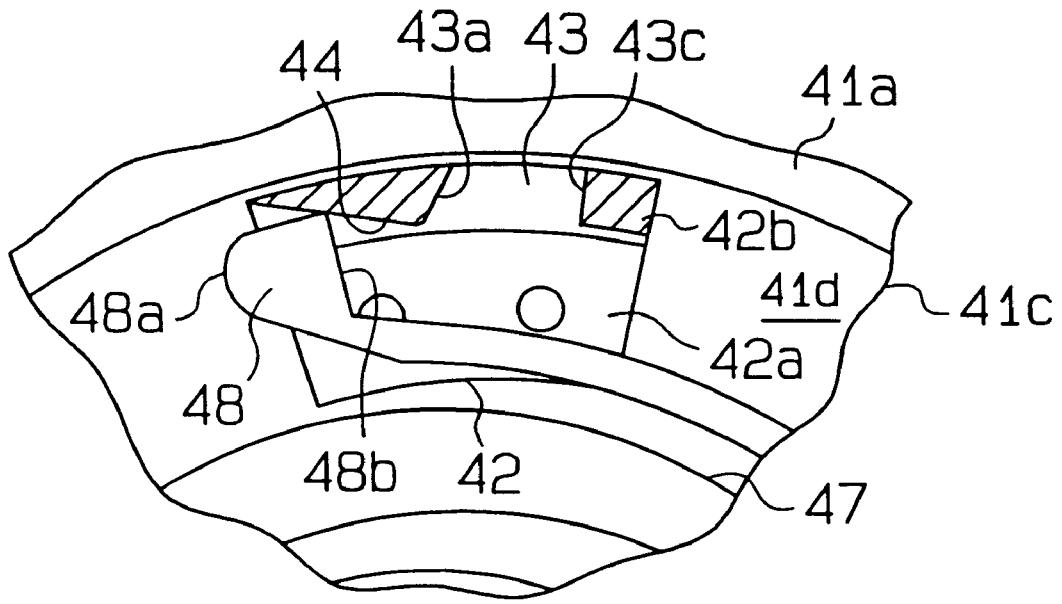
FIG. 10 is a partial cross sectional view for describing a third step in the pulley assembly method.
Figure 11:
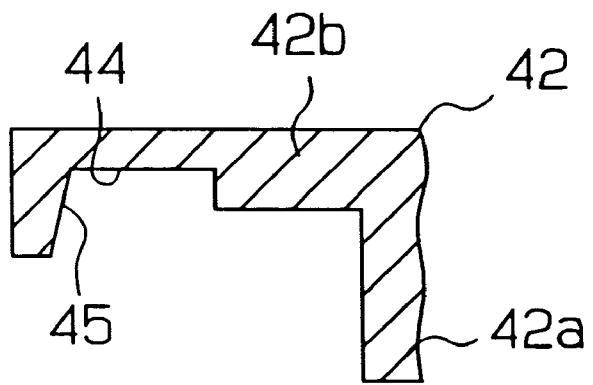
FIG. 11 is a partial cross sectional view taken on the line 11—11 of FIG. 2.

As shown in FIGS. 9-11, an inclined guide surface 44 is formed on the inner surface of the outer wall 42b. Each guide surface 44 is inclined as illustrated and is joined to the power transmitting surface 43a. A guide limit surface 45 is formed on the outer wall 42b of each coupler 42 to the side of the inclined guide surface 44 and is joined to the third surface 43b.

A bushing 46 is secured to the front end of the drive shaft 16. A flange 46a is integrally formed at the front end of the bushing 46. Spiral springs 47 are integrally formed with the flange 46a of the bushing 46. The cross-sectional shape of each spiral spring 47 is rectangular. Each spiral spring 47 includes an inner end 47a, an outer end 48 and a middle portion connecting the inner and outer ends 47a, 48. Each inner end 47a is joined to the flange 46a. The cross sectional area of each spiral spring 47 gradually increases toward the middle and decreases gradually from the middle to the outer end 48. Each spiral spring 47 is arranged about the axis L and is spaced 180 degrees from the other spiral spring 47.

The outer end 48 of each spiral spring 47 includes a power reception surface 48a and a contact surface 48b. The power reception surface 48a is located at the trailing side of the outer end 48 and projects in the trailing direction. The contact surface 48b is located at the leading side of the outer end 48 and is flat. The outer end 48 of each spiral spring 47 engages the coupling hole 43, and the power reception surface 48a abuts against the first surface, or the power transmission surface 43a. The couplers 42 and corresponding spiral springs 47 transmit the rotation of the pulley mechanism 18 to the shaft 16. In this state, the contact surface 48b of the outer end 48 faces but does not contact the second surface 43c of the coupling hole 43.

Figure 5:
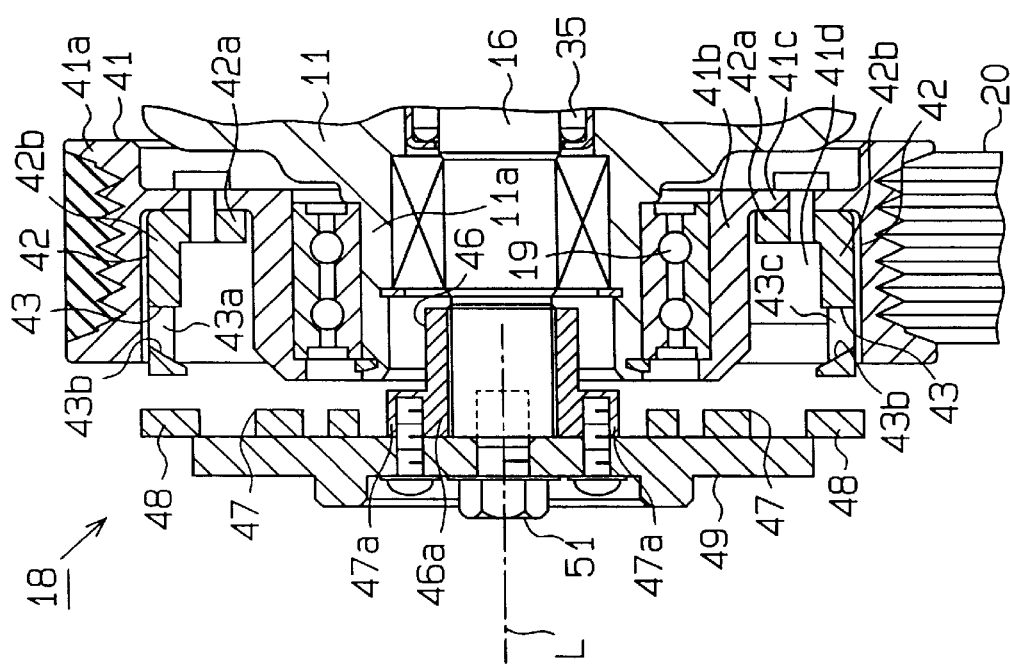
FIG. 5 is a partial longitudinal cross sectional view showing the vicinity of the pulley when power transmission is disconnected.

As shown in FIG. 5, before the spiral springs 47 are engaged with the couplers 42, during installation, the spiral springs 47 are located in one plane. In this state, the outer ends 48 are located axially forward of the coupling holes 43. As shown in FIG. 1, the spiral springs 47 are deformed rearwardly when fully installed. During installation, the outer ends 48 of the spiral springs 47 are rearwardly deformed and fitted in the corresponding coupling holes 43. Accordingly, the outer ends 48 of the spiral springs 47 are urged axially forward and the urging force is opposed by the abutment of the outer ends 48 against the third surfaces 43b, as shown in FIG. 1. The spiral springs 47 form urging means.

Figure 4:
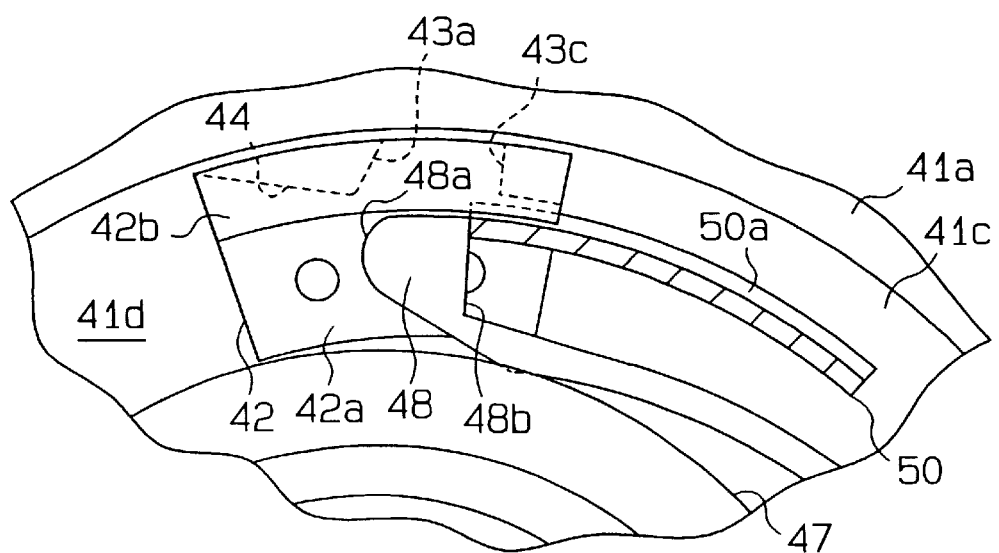
FIG. 4 is a partial enlarged cross sectional view for illustrating the disconnection of power transmission.

A release plate 49 is secured to the drive shaft 16 by a bolt 51. Accordingly, the release plate 49 integrally rotates with the drive shaft 16 and the bushing 46 that constitute a second rotor with the release plate 49. A pair of release members, or projections 50, which project axially rearward from the peripheral edge of the release plate 49 (See FIG. 7). The release projections 50 are spaced apart by 180 degrees. The distal ends of the release projections 50 are located radially inside the couplers 42 and are offset in the rotational direction as shown in FIG. 2. The release projections 50 do not interfere with the couplers 42. A lip 50a is formed at the distal end of each release projection 50. When there is relative rotation between the sheave 41a and the shaft 16 and each release projection 50 is overlapped by each coupler 42, the trailing end of that release projection is positioned in the vicinity of the inner surface of the outer wall 42b and the lip 50a enters the coupler 42 and faces the limit surface 43b as shown in FIGS. 3 and 4.

An assembly method for the pulley mechanism 18 will now be described.

First Step

First, as shown in FIGS. 5 and 7, the bushing 46 is fastened to the release plate 49. Then, the release plate 49 is fastened to the front end of the drive shaft 16 with the bolt 51. In this state, the free outer ends 48 of the spiral springs 47 are forward of the corresponding coupling holes 43 as shown in FIG. 5. Also, each outer end 48 is located in the trailing side of the corresponding coupling hole 43 with regard to the pulley rotation.

Second Step

As shown in FIG. 7, a cup-shaped jig 61 is employed during the assembly process. A pair of notches 61a are formed in the rim of the jig 61. The notches 61 are spaced apart by 180-degrees. A through hole 61b is formed in the center of the jig 61. The outer diameter of jig 61 is slightly smaller than the inner diameter of the sheave 41a.

Figure 8:
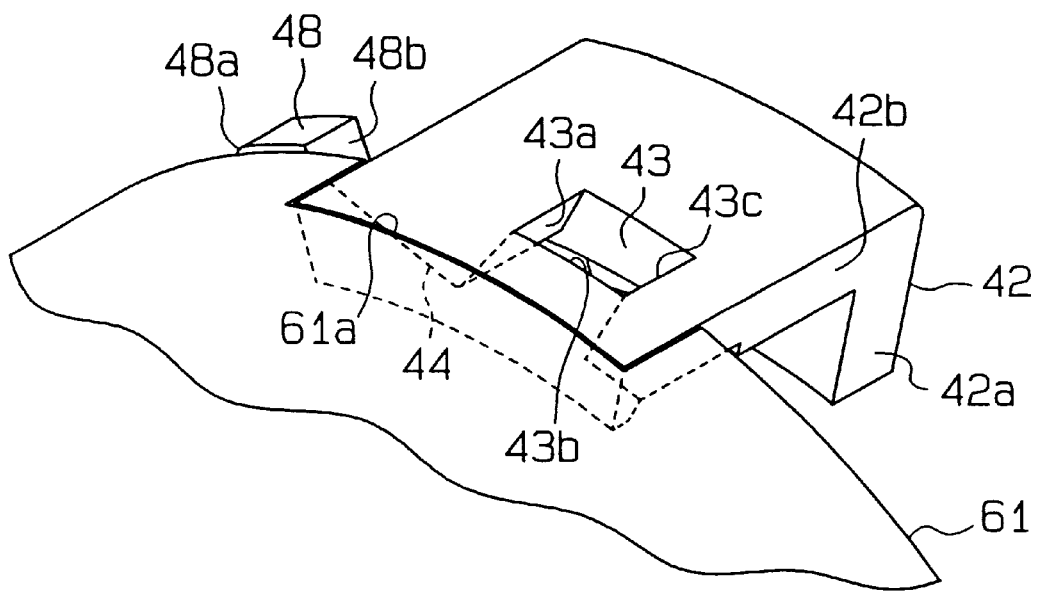
FIG. 8 is a partial perspective view illustrating a second step in the pulley assembly method.

Then, the axis of the jig 61 is aligned with the axis L of the drive shaft 16 and the notches 61a are aligned with the corresponding couplers 42. Then, as shown in FIGS. 8 and 9, when the jig 61 is moved toward the pulley rotor 41, the outer end 48 of each spiral spring 47 is pressed axially rearward by the rim of the jig 61. Accordingly, since the inner ends 47a of the spiral springs 47 are fixed to the drive shaft 16, the spiral springs are deformed as shown in FIG. 1. As a result, the outer ends 48 are moved axially rearward toward the coupling holes 43.

Third Step

Then, as shown in FIG. 7, a hexagonal wrench 62 is placed in a hexagonal hole 51a of the bolt 51 through the through hole 61b of the jig 61. The hexagonal wrench 62 is relatively rotated to the jig 61 and the pulley rotor 41 so that the drive shaft 16, the bushing 46 and the springs 47 rotate in the direction indicated in FIG. 2. This causes the drive shaft 16 to rotate with respect to the pulley rotor 41, thus moving the outer ends 48 of the spiral springs toward the coupling holes 43.

As shown in FIG. 10, each outer end 48 abuts against the corresponding guide surface 44 and moves toward the coupling hole 43 along the guide surface 44. Accordingly, each spiral spring 47 is inwardly deformed in accordance with the inclination of the corresponding guide surface 44 and each outer end 48 is inwardly displaced. Then, each outer end 48 separates from the rim of the jig 61 and engages the limit surface 45 of the associated coupler 42, which limits its forward movement. When each outer end 48 passes by the corresponding guide surface 44, it restoratively moves into the corresponding coupling hole 43. This positively engages each outer end 48 of the spiral springs 47 with the corresponding coupling hole 43.

Operation of the pulley mechanism 18 will now be described.

Power from the engine 21 is transmitted to the drive shaft 16 through the belt 20, the pulley rotor 41, the couplers 42, the spiral springs 47 and the bushing 46. The power transmission rotates the drive shaft 16 and operates the compressor. When the load applied to the drive shaft 16 increases during the operation of the compressor, the drive shaft 16 rotates with respect to the pulley rotor 41. As shown in FIG. 3, this moves the couplers 42 toward the corresponding release projections 50. During this movement, the spiral springs 47 are deformed such that their middle portions expand outward, and the excessive load is, to some extent, absorbed by the springs 47.

When the load does not exceed a predetermined value, the relative rotation between the pulley rotor 41 and the drive shaft 16 is small and the spiral springs 47 are not greatly deformed. Therefore, when the outer ends 48 of the spiral springs 47 abut against the release projections 50, the force between them is not excessive. Accordingly, the engagement of the spiral springs 47 with the couplers 42 is maintained, and this continues the power transmission from the engine 21 to the drive shaft 16. Fluctuation of the load within a predetermined range is absorbed by deformation of the spiral springs 47.

However, when the load on the compressor exceeds the predetermined value, the relative rotation between the pulley rotor 41 and the drive shaft 16 increases, and this increases the deformation of the spiral springs 47. Then, the forces applied by the release projections 50 against the contact surfaces 48b of the outer ends 48 increase significantly. Therefore, the outer end 48 of each spiral spring 47 is deformed radially inward and guided by the power transmission surface 43a. Eventually, each outer end 48 is separated from the power transmission surface 43a and the limit surface 43b. This releases the restorative force of each spiral spring 47. That is, the springs 47 are free to disengage from the couplers 42. The power transmission surfaces 43a and the release projections 50 constitute a releasing means.

The spiral springs 47, when disengaged from the couplers 42, return to their natural state as shown in FIG. 5, and the outer ends 48 are located axially forward of the couplers 42. Upon release, each spiral spring 47 is released from abutment with the corresponding release projection 50, and the outer ends 48, which have been elastically deformed, move to the position shown in FIG. 5. Since the outer ends 48 are axially offset from the corresponding coupling holes 43, the outer ends 48 do not reengage the corresponding coupling holes 43. When the spiral springs 47 are completely separated from the coupling holes 43, the power transmission between the pulley rotor 41 and the drive shaft 16 is discontinued. This prevents the compressor load from affecting the engine 21.

The above embodiment has the following advantages.

When the engine 21 is run at high or middle speed and is suddenly decelerated, the deceleration of the compressor is slower than that of the engine 21 for a moment. During that moment, the compressor seems to be operating independently. This is because the tension of the belt 20 is momentarily relieved and the compressor has inertia. In this state, the outer ends 48 of the spiral springs 47 are displaced in the rotational direction from the power transmission surface 43a in the corresponding coupling hole 43.

Figure 6:
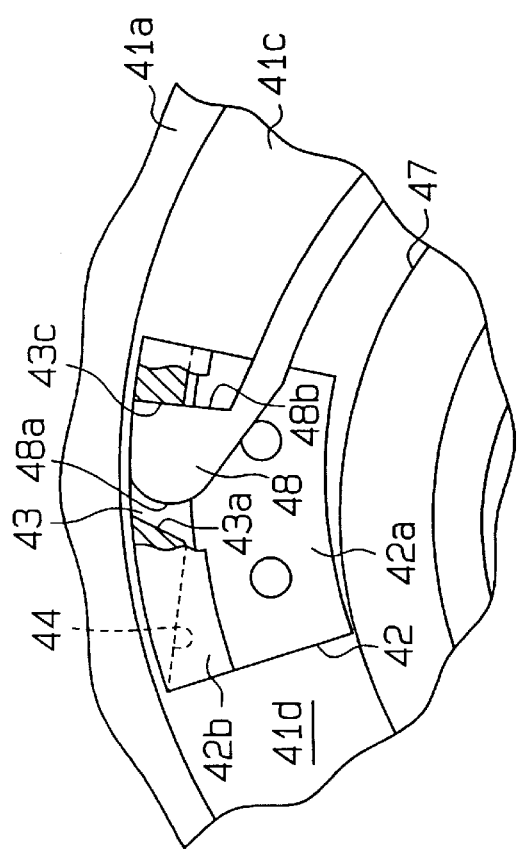
FIG. 6 is a partial enlarged cross sectional view showing a state when negative torque is applied to the compressor.

However, each second surfaces 43c is formed to face the corresponding power transmission surface 43a in each coupling hole 43. Accordingly, as shown in FIG. 6, when each outer end 48 is displaced in the rotational direction from the corresponding power transmission surface 43a, further displacement is limited by the abutment of each contact surface 48b against the corresponding engagement surface, or second surface 43c. As a result, the outer end 48 remains within the coupling hole 43. Thus, the vehicle air-conditioning system is not unnecessarily disconnected.

The couplers 42 are separate parts from the pulley rotor 41 and are fixed to the pulley rotor 41. Each coupler 42 includes the first to fourth surfaces 43a, 43c, 43b, 43d, the guide surface 44 and the limit surface 45. Accordingly, compared to directly forming the surfaces 43a–43c, 44, 45 on the pulley rotor 41, the use of the couplers 42 simplifies production.

Each coupler 42 is located in the inner space 41d of the pulley rotor 41. Accordingly, it is not necessary to extend the axial length of the compressor.

The couplers 42 are arranged about the axis L at equal spacing. The number of the spiral springs 47 employed is the same as the number of the couplers 42. The outer ends 48 of the spiral springs 47 are arranged about the axis L at equal intervals to engage the corresponding couplers 42. The inner ends 47a of the spiral springs 47 are arranged about the axis L at equal intervals and are joined to the flange 46a of the bushing 46. Accordingly, power transmission between the couplers 42 and the bushing 46 is performed at plural, equally spaced points about the axis L. As a result, when power is transmitted from the engine 21, inclination of the bushing 46 and the drive shaft 16 is suppressed and the rotation of the drive shaft 16 is stabilized.

The cross-sectional area of each spiral spring 47 increases from the inner end 47a toward the middle portion and decreases from the middle portion toward the outer end 48. In other words, the spiral spring 47 avoids concentration of stress during deformation by increasing the cross sectional area at locations where stress is concentrated during power transmission. Accordingly, the space occupied by the spiral spring 47 in the inner space 41d is reduced, which reduces the size of the pulley rotor 41 and the pulley mechanism 18.

As shown in FIG. 1, the cross-sectional shape of the spiral springs 47, when deformed, is generally like a parallelogram. To correspond to the side of the corresponding spring 47, each limit surface 43b is inclined. Accordingly, each limit surface 43b makes full surface contact with the corresponding outer end 48 of the spiral springs 47. As a result, the position of each outer end 48 is stable, which stabilizes the operation of the power transmission mechanism.

The guide surface 44 is formed on each coupler 42. Accordingly, each outer end 48 moves radially in accordance with the inclination of the guide surface 44 by following the guide surface 44 during relative rotation between the pulley rotor 41 and the spiral springs 47.

Each limit surface 45 is formed to the side of the associated guide surface 44. Accordingly, when each outer end 48 is guided to the corresponding coupling hole 43 by the guide surface 44, the movement of each outer end 48 based on the force of the spiral spring 47 in the direction of the axis L is limited. This facilitates assembly.

During release, each outer end 48 is displaced radially inward from the coupler 42 and is disengaged from the limit surface 43b. Accordingly, there is no need to provide space in the radially outward direction of the coupler 42 to accommodate the outer ends 48. As a result, the sizes of the pulley rotor 41 and the pulley mechanism 18 are limited.

When the release projections 50 are overlapped by a corresponding coupler 42, the trailing end of each projection 50 is located beneath, or radially inside the corresponding outer wall 42b. That is, the release projections 50 are located in the inner spaces 41d. As a result, the sizes of the pulley rotor 41 and the pulley mechanism 18 are limited.

When the release projections 50 are overlapped by the corresponding couplers 42, each lip 50a enters the corresponding coupler 42 and is located axially rearward from the corresponding limit surface 43b. Accordingly, the trailing ends of the release projections 50 abut against the corresponding outer ends 48 at radially further outward positions compared to when the lips 50a are not provided. This applies greater moment to the spiral spring 47. As a result, when the compressor torque load becomes excessive, the spiral springs 47 are greatly deformed, and the outer ends 48 are offset greatly in the radially inward direction from the limit surface 43b, thus disconnecting the power transmission.

The present invention can further be embodied as follows.

Figure 12:
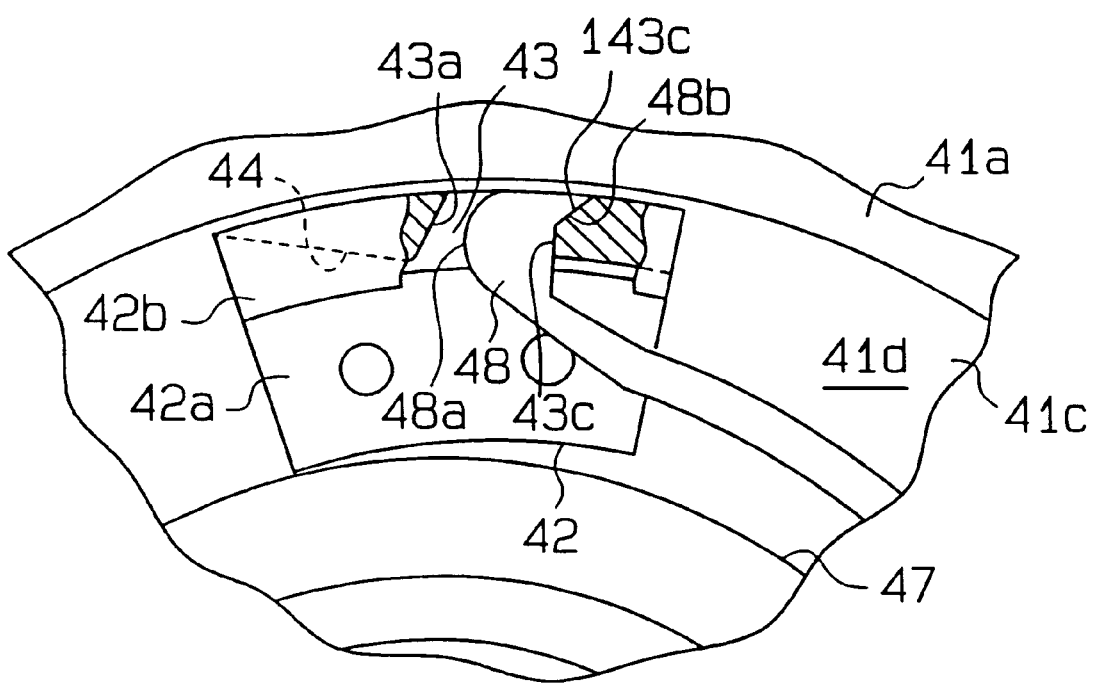
FIG. 12 is a partial enlarged cross sectional view showing a further embodiment.

A limit part 143c may be formed on each second surface 43c to limit the radially inward displacement of the outer ends 48. See FIG. 12. In this case, the shape of each contact surface 48b corresponds to the shape of the corresponding limit part 143c and is partly inclined as illustrated. When the compressor torque load becomes negative, the second surfaces 43c limit the displacement of the outer ends 48 in the rotational and radial directions. Accordingly, in this state, if a radially inward force is applied to the outer ends 48 by the winding of the spiral spring 47, the outer ends 48 are prevented from disengaging from the contact surfaces 48b. This prevents inadvertent release of the pulley mechanism 18.

The inclined guide surfaces 44 may be formed on the jig 61 instead of the pulley rotor 41. In this case, the inclined guide surfaces 44 are removed after assembling the pulley mechanism 18, and this simplifies the structure of the couplers 42.

The guide limit surfaces 45 may be formed in the jig 61 instead of the pulley rotor 41. In this case, the guide limit surfaces 45 can be removed after assembling the pulley mechanism 18, and this simplifies the structure of the coupler 42.

The inner edges of the limit surfaces 45 may be shaped so that the outer ends 48 are more easily engaged with the coupling holes 43 during assembly. That is, the inner edges of the guide surfaces 45 may be inclined inward from the axially forward end of the wall 42b toward the axially rearward end of the outer wall 42b. In other words, a ramp or cam surface is formed to guide the outer ends 48 into the coupling holes 43. This enables employment of the following simple assembly steps.

First Step

The bushing 46 (the inner end 47a of the spiral spring 47) is fixed on the release plate 49, and the release plate 49 is fixed to the front of the drive shaft 16 by the bolt 51. In this state, the outer ends 48 are aligned with the corresponding coupling holes 43 in the angular direction.

Second and Third Steps

Second and third steps are performed using the jig 61. In the process of engaging each outer end 48 with the corresponding coupling hole 43, each outer end 48 initially contacts the front end of the corresponding wall portion 42b, or the outer surface of the corresponding limit surface 45. Then, each outer end 48 is guided by the ramped guide surface 45, is displaced radially inward, and then engages the coupling hole 43.

At least one of the first to the third surfaces 43a, 43c, 43b, guide surface 44 and the limit surface 45 may be directly formed on the pulley rotor 41. If all of the surfaces 43a–43c, 44, 45 are formed on the pulley rotor 41, there is no need to provide separate couplers 42 and this reduces the number of parts.

In a reversal of parts, a power transmitting surface may be formed to the drive shaft 16, one end of each spiral spring 47 may be fixed to the pulley rotor 41, and the other end may engage the power transmitting surface of the drive shaft 16.

In the above embodiments, the number of the spiral springs employed does not have to be two. If the number of the spiral springs is one, the structure of the pulley mechanism 18 is simplified. If more than three spiral springs are used, inclination of the drive shaft during power transmission is more firmly prevented. Instead of the spiral springs, coil springs may be used.

In the above embodiments, one of the release projections 50 may contact the corresponding outer end 48 and may disengage the outer end 48 from the limit surface 43b. In this case, the release projections 50 may be arranged about the axis L at unequal intervals. This disengages each outer end 48 from the corresponding limit surface 43b in turn. Accordingly, when the torque load exceeds the predetermined value, power transmission is smoothly disconnected.

In the above embodiments, the outer ends 48 are deformed radially inward and are thus disengaged from the limit surfaces 43b. Instead, the outer ends 48 may be deformed radially outward and may disengage from the limit surface 43b in the radially outward direction.

The part of the contact surface 48b contacting the release projection 50 may be inclined.

The pulley mechanism 18 may be employed to other types of piston type compressors, such as, wobble plate compressors, wave cam type compressors, and double-headed piston type compressors. Other than piston type compressors, the pulley mechanism 18 may be employed to scroll type compressors, vane type compressors and rotary type compressors.

Instead of a compressor for vehicle air-conditioning, the powered device may be a hydraulic pump of a hydraulic power steering mechanism or an alternator.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A power transmission mechanism having a first rotor and a second rotor, wherein the second rotor is coaxial with the first rotor, and power from the first rotor is transmitted to the second rotor to rotate the first and the second rotors in the same direction, the mechanism comprising:

a resilient power transmission member located between the first and the second rotors, the power transmission member having a fixed end that is fixed to one of the first and the second rotors and a free end that is releasably engaged with the other of the first and the second rotors;

a transmission surface provided on the other of the first and the second rotors to oppose and engage the free end of the power transmission member, wherein when the transmission surface engages the free end of the transmission member, the transmission surface transfers power from the first rotor to the second rotor, and relative rotation between the first and the second rotors is permitted due to deformation of the power transmission member in accordance with the load of the second rotor, and wherein the transmission of power is discontinued if the free end of the transmission member is separated from the transmission surface;

a release member for separating the free end of the power transmission member from the transmission surface in accordance with relative rotation between the first rotor and the second rotor when the load applied to the second rotor exceeds a predetermined value; and an engaging surface on the other of the first and the second rotors and opposed to the transmission surface for engaging the free end of the power transmission member if the second rotor is driven faster than the first rotor by inertia when the first rotor is decelerated.

2. The mechanism according to claim 1, wherein the fixed end of the power transmission member is fixed to the second rotor and the free end of the power transmission member is releasably engaged with the first rotor.

3. The mechanism according to claim 1, wherein the transmission surface is in a trailing position relative to the free end of the power transmission member, and wherein the engaging surface is in a leading position relative to the free end of the power transmission member.

4. The mechanism according to claim 3, wherein the transmission surface inclines such that a radially inward part of the transmission surface trails behind a radially outward part of the transmission surface.

5. The mechanism according to claim 3, wherein the engaging surface extends in the radial direction.

6. The mechanism according to claim 3, wherein the first rotor has a coupler having a rectangular coupling hole, the coupling hole being surrounded by a wall, wherein the transmission surface and the engaging surface form parts of the wall of the coupling hole.

7. The mechanism according to claim 3 further comprising:

an urging member for urging the free end of the power transmission member in an axial direction of the rotors; and a limiting surface provided on the inner wall of the coupling hole for normally inhibiting the axial movement of the free end of the power transmission member against the urging force of the urging member and for permitting the free end to move axially after the free end moves radially inward.

8. The mechanism according to claim 7, wherein the power transmission member and the urging member are integrally joined.

9. The mechanism according to claim 7, wherein the free end of the power transmission member is axially offset from the fixed end against the urging force of the power transmission member when the free end is engaged with the coupling hole.

10. The mechanism according to claim 6, wherein the coupler has a guide surface for guiding the free end of the power transmission member toward the transmission surface when the coupler and the power transmission member are moved into engagement with one another during an assembly procedure.

11. The mechanism according to claim 2, wherein the release member is provided on the second rotor and is located in a leading position relative to the free end of the power transmission member.

12. A power transmission mechanism having a first rotor and a second rotor, wherein the second rotor is coaxial with the first rotor, and power from the first rotor is transmitted to the second rotor to rotate the first and the second rotors in the same direction, the mechanism comprising:

a resilient power transmission member located between the first and the second rotors, the power transmission member having a fixed end that is fixed to the second rotor and a free end that is releasably engaged with the first rotor;

a transmission surface provided on the first rotor to oppose and engage the free end of the power transmission member, wherein when the transmission surface engages the free end of the transmission member, the transmission surface transfers the power of the first rotor to the second rotor, and relative rotation between the first and the second rotors is permitted due to deformation of the power transmission member in accordance with the load of the second rotor, and wherein the transmission of power is discontinued if the free end of the transmission member is separated from the transmission surface;

a release member for separating the free end of the power transmission member from the transmission surface in accordance with relative rotation between the first rotor and the second rotor when the load applied to the second rotor exceeds a predetermined value; and an engaging surface on the first rotor and opposed to the transmission surface for engaging the free end of the power transmission member if the second rotor is driven faster than the first rotor by inertia when the first rotor is decelerated;

an urging member for urging the free end of the power transmission member along an axial direction of the second rotor; and an inhibiting surface provided on the first rotor for normally inhibiting the axial movement of the free end of the power transmission member against urging force of the urging member and for releasing the inhibition after the free end moves along the transmission surface.

13. The mechanism according to claim 12, wherein the transmission surface is in a trailing position relative to the free end of the power transmission member, and wherein the engaging surface is in a leading position relative to the free end of the power transmission member.

14. The mechanism according to claim 12, wherein the transmission surface inclines such that a radially inward part of the transmission surface trails behind a radially outward part of the transmission surface.

15. The mechanism according to claim 12, wherein the engaging surface extends in the radial direction.

16. The mechanism according to claim 12, wherein the first rotor has a coupler having a rectangular coupling hole, the coupling hole being surrounded by a wall, wherein the transmission surface and the engaging surface form parts of the wall of the engaging hole.

17. The mechanism according to claim 12, wherein the power transmission member and the urging member are integrally joined.

18. The mechanism according to claim 17, wherein the free end of the power transmission member is axially offset from the fixed end against the urging force of the power transmission member when the free end is engaged with the coupling hole.

19. The mechanism according to claim 16, wherein the coupler has a guide surface for guiding the free end of the power transmission member toward the transmission surface when the coupler and the power transmission member are moved into engagement with one another during an assembly procedure.

20. The mechanism according to claim 12, wherein the release member is provided on the second rotor and is located in a leading position relative to the free end of the power transmission member.

21. The mechanism according to claim 12, wherein the power transmission member includes a spiral spring.

* * * * *